United States Patent

[11] 3,567,959

[72] Inventors Hisashi Kaneko;
Atsushi Tomozawa; Yukio Takimoto,
Tokyo-to, Japan
[21] Appl. No. 675,402
[22] Filed Oct. 16, 1967
[45] Patented Mar. 2, 1971
[73] Assignee Nippon Electric Company Limited
Tokyo, Japan
[32] Priority Oct. 20, 1966
[33] Japan
[31] 41/69163

[54] PHASE-LOCKED PULSE GENERATOR WITH FREQUENCY MAINTAINING FUNCTION
7 Claims, 7 Drawing Figs.

[52] U.S. Cl. .................... 307/232, 307/269, 307/295, 328/63, 328/133, 328/155, 329/107, 329/122
[51] Int. Cl. .................... H03k 5/20
[50] Field of Search .................... 307/232, 262, 269, 295; 328/63, 109, 133, 134, 155; 329/107, 122, 123; 331/25, 27

[56] References Cited
UNITED STATES PATENTS

| | | | |
|---|---|---|---|
| 3,080,533 | 3/1963 | Edwards | 331/27 |
| 3,142,806 | 7/1964 | Fernandez | 307/232X |
| 3,195,068 | 7/1965 | DuVall | 331/27 |
| 3,204,195 | 8/1965 | Maestre | 307/232X |
| 3,249,878 | 5/1966 | Magnin | 328/63 |
| 3,293,555 | 12/1966 | Mazure et al. | 328/155 |
| 3,308,387 | 3/1967 | Hackett | 328/155 |
| 3,440,540 | 4/1969 | Hane et al. | 328/134X |

*Primary Examiner*—Stanley D. Miller, Jr.
*Attorney*—Hopgood and Calimafde

ABSTRACT: A phase-locked pulse generator for producing clock pulses for reception of digital signals including timing information of varying density and comprising a sampling type phase comparator and a low pass filter for temporarily holding, in the case of a reduction in the timing information density, the timing information detected by the phase comparator. Due to this holding action, the frequency of the pulse generator is controlled by the output of the low pass filter and is maintained substantially unchanged even when the timing information is not continually included in the digital signal.

INVENTORS
HISASHI KANEKO
ATSUSHI TOMOZAWA
BY YUKIO TAKIMOTO
Hopgood & Calimafde
ATTORNEYS INVENTORS
HISASHI KANEKO
ATSUSHI TOMOZAWA
YUKIO TAKIMOTO
BY Hopgood & Calimafde
ATTORNEYS

PHASE-LOCKED PULSE GENERATOR WITH FREQUENCY MAINTAINING FUNCTION

BACKGROUND OF THE INVENTION

This invention provides a phase-locked pulse generator for generating a timing pulse train synchronized with timing information contained in the input digital signal. Conventional devices of this kind comprise: a phase comparator for comparing the phase difference between an input signal and a reference signal individually applied to its input terminals; a low pass filter for deriving from the output of the phase comparator a voltage depending on the phase difference between the input signals applied to the phase comparator; and a voltage-controlled oscillator for generating an oscillation signal varying in frequency in response to the output of the low pass filter and for supplying this oscillation signal as the reference signal to one of the input terminals. The output of the oscillator is derived from an output terminal as the output timing pulse train. In the conventional phase-locked oscillator, a ring modulator or a flip-flop circuit is used as the phase comparator and an input signal to such oscillator includes continuous timing information. Further details of such conventional oscillator are set forth in a paper entitled "Properties and Design of the Phase-Controlled Oscillator with a Sawtooth Comparator" by C. J. Byrne, THE BELL SYSTEM TECHNICAL JOURNAL, Mar. 1962, pp. 559—602. The term "timing information" herein refers to the timing positions of the leading and trailing edges of each pulse of a digital signal in the case of an *NRZ* (no return to zero) code, or either of the leading and trailing edges in the case of an *RZ* (return to zero) code.

In order for the conventional pulse communication system and the like to extract a timing pulse signal from an input digital signal in which the timing information is not continuous (i.e., in which the occurence probability of the logical values o and 1 is not constant), it has been the practice to apply the input digital signal to a tank circuit to produce a pulse train containing continuous timing information, and then to apply the pulse train to the phase-locked oscillator. However, since such pulse train is adversely affected to a considerable extent by the resonant frequency and the quality factor of the tank circuit, stable performance cannot be expected. If the input digital signal is applied directly to the input of the phase-locked oscillator without using the tank circuit, stable performance might be obtained. However, inasmuch as the phase-locked oscillator includes a ring modulator or a flip-flop circuit, the correct phase comparison is not performed when the timing information is not present in the input digital signal. Under these circumstances, phase-locking cannot be maintained in the normal state, and furthermore, the frequency range within which phase-locked oscillation is obtainable is reduced as the density of the timing information in the input digital signal decreases.

OBJECTS OF THE INVENTION

It is an object of the present invention to provide a phase-locked pulse oscillator or generator capable of proper operation even when an input supplied thereto is a pulse train containing discontinuous timing information or having the varying occurrence probabilities of the logical values 0 and 1.

A further object of the invention is to provide a phase-locked pulse generator wherein a decrease in the frequency range of the realizable phase-locking is relatively small compared with a decrease in the density of the timing information.

SUMMARY OF THE INVENTION

Briefly, the device of the present invention may comprise: a timing information extraction circuit for deriving timing information from an input digital signal, a phase comparator for receiving the extracted timing information at one of a pair of the input terminals thereof, a low pass filter for receiving the output of said phase comparator, and a variable frequency pulse oscillator for generating pulses of varying frequency in response to the output of the low pass filter and for supplying the generated pulses to the other of the input terminals of the phase comparator, wherein the phase comparator is composed of a sampling switch which is controlled to an "on" and an "off" state in response to 1 and 0 of the first input, respectively.

The timing extraction circuit generates the timing information pulses, each of which has a pulse width approximately equal to a half of one bit time interval of the input digital signal at the time point of the leading and trailing edges of each pulse of the digital signal, when the same is an *NRZ* code. On the other hand, when the digital signal is an *RZ* code, each of the timing information pulses may have a pulse width equal to that of the input digital signal. In the latter case, the timing pulse extraction circuit may comprise a pulse shaping circuit and a buffer circuit. The extracted timing information pulse and the output of the variable frequency oscillator are applied to the pair of the input terminals of the phase comparator, respectively, for phase comparison. The phase comparison is performed only within the period when the input digital signal contains the timing information. Also, during this period, a capacitor, which is part of a small time constant charging circuit in the low pass filter section, is charged by the output of the phase comparator. The electric charge stored in the capacitor is then discharged through a larger time constant circuit during the period when the input digital signal does not contain the timing information. Since the time constant during the discharging period is larger, the low pass filter serves as a data holding means even during the period when the timing information is not contained in the input digital signal. As a consequence, the oscillation frequency of the variable frequency oscillator controlled by the output voltage of the low pass filter is maintained substantially constant.

DESCRIPTION OF PREFERRED EMBODIMENTS

Figure 1:
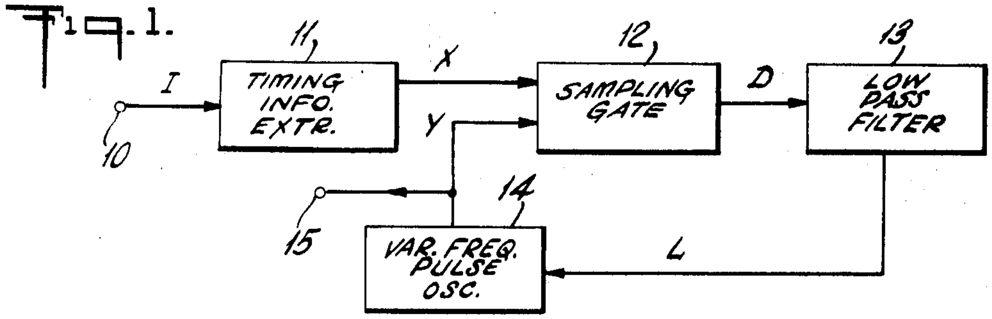
FIG. 1 is a block diagram of a first embodiment of the invention.

FIG. 1 shows a phase-locked generator which includes a timing information extraction circuit 11 for receiving an input digital signal I having a varying occurrence probability of the logical values 0 and 1 (FIG. 2*a*), and which produces timing information pulses X (FIG. 2*b*) in response thereto. A sampling gate 12 is provided for generating an output signal D (FIG. 2*d*), in response to the phase difference between the timing information pulse X and an input pulse signal Y (FIG. 2*c*), applied respectively to the input terminals thereof. The generator of FIG. 1 further includes a low pass filter 13 for deriving a low frequency signal L (FIG. 2*e*) from the output signal D and a voltage-controlled variable frequency pulse oscillator 14 controlled by the low frequency signal L for supplying the oscillation output to one of the input terminals of the sampling gate 12 as the input pulse signal Y. An output terminal 15 is provided for deriving the output pulse train Y of the pulse oscillator 14 as the timing pulse of the input digital signal I.

Figure 2:
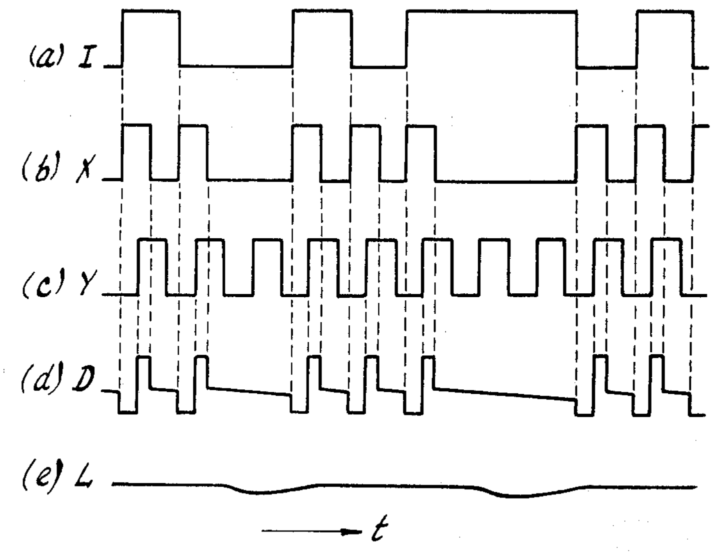
FIG. 2 is a group of waveform diagrams showing waveforms at various points in the block diagram of FIG. 1.

Upon reception of the input digital signal I at the input terminal 10, the timing information pulse X is obtained at the output terminal of the timing extraction circuit 11, which detects leading and trailing edges of the input digital signal I, and generates pulses of a width approximately equal to a half to one time of the one-bit time interval of the input digital signal I. The timing information pulse X is applied as a sampling pulse to the sampling gate 12 at one of its input terminals. To the other of the input terminals of the sampling gate 12, the output pulse Y of the pulse generator 14 is applied, and it is sampled with the timing information pulse X, and then applied to the low pass filter 13. The output voltage of the sampling gate 12 has the waveform shown in FIG. 2*d*, and will be discussed later with reference to FIG. 4. The output signal of the sampling gate 12 is averaged by the low pass filter 13 as shown in FIG. 2*e*, and is used to control the oscillation frequency of the pulse oscillator 14.

Figure 3:
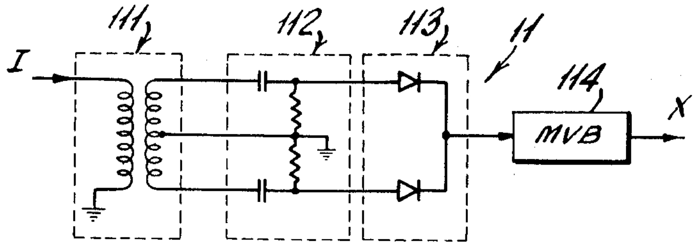
FIG. 3 is a circuit diagram showing an example of a timing information extraction circuit in the embodiment of FIG. 1.

FIG. 3 shows one example of the timing extraction circuit 11 for the case of the *NRZ* code-type input signal I. This circuit comprises: a pulse transformer 111 having a central tap at the secondary winding for generating a pair of pulses of identical and opposite polarities with respect to the input pulse; a differential circuit 112 for differentiating the pulses of opposite polarities induced by the transformer 111 to produce the differentiated pulses; a rectifying circuit 113, having two diodes which individually receive the differentiated pulses at their anodes and having cathodes commonly connected, for producing at the combined cathodes an output obtained by clipping the negative components of the differentiated pulses; and a monostable multivibrator 114 for generating the timing information pulses X only when the output pulse is produced by the rectifying circuit 113.

When the input *NRZ* digital signal I is applied to the primary winding of the pulse transformer 111 of FIG. 3, pulses of identical and opposite polarities to that of the input pulse I are induced in the secondary windings. At the output of the differential circuit 112, an output voltage is produced only at the time points of the leading and trailing edges of each of the opposite polarity pulses. By applying these differentiated pulses to the rectifying circuit 113, the negative components are eliminated, with the result that only a positive voltage output is produced at the output terminal of the rectifying circuit 113 at the time points of the leading and trailing edges of the input *NRZ* signal I. In response to the positive output voltage of the circuit 113, the monostable multivibrator 114 produces timing information pulses having a width equal to a half of the one-bit time interval of the signal I.

Although in this first embodiment the circuit as shown in FIG. 3 is used to extract the timing information pulses X from the *NRZ* input digital signal, any other circuit capable of extracting the timing information to produce such pulses may be employed. Also, when the input digital signal is the *RZ* code, a pulse shaping circuit or buffer circuit may be employed as the timing extraction circuit. Alternatively, the input signal may be applied direct to the sampling gate, with the result that the device may be simplified.

Figure 4:
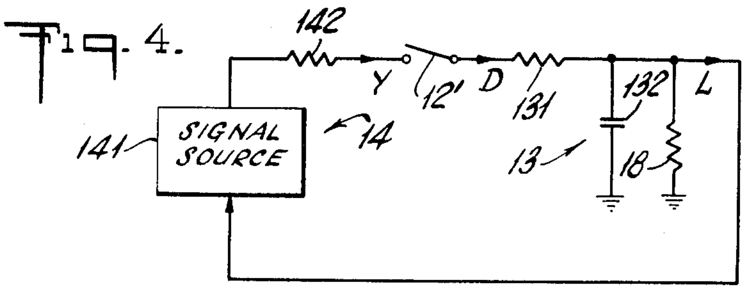
FIG. 4 is an equivalent circuit of the embodiment of FIG. 1.

Referring now to FIG. 4, the equivalent circuit of the embodiment of the invention shown in FIG. 1 comprises: a signal source 141 for generating the output voltage shown in FIG. 2*c;* an equivalent internal resistance 142 of the pulse generator or oscillator 14 connected to the signal source 141; a switch 12′ representing the equivalent circuit of the sampling gate 12, which is opened and closed corresponding to the logical values 0 and 1 of the timing information pulse (FIG. 2*b*)*; a resistor 131 and a capacitor 132 representing in principle the low pass filter 13 connected to the switch 12′; and a load resistor 18 of the low pass filter 13.*

When both the timing information pulse X serving as the sampling pulse and the output pulse Y of the pulse generator 14 are the logical value 1, the sampling gate 12 is turned "on," that is, the switch 12′ is closed, with the result that the output voltage of the pulse generator 14 charges the capacitor 132 during the time interval proportional to the phase difference between the timing information pulse X and the output pulse Y of the pulse generator 14, with the closed-period time constant $T_{on}$ being determined by the internal resistance 142 of the pulse generator 14, the resistor 131, the capacitor 132 and the load resistor 18. As shown in FIG. 2*d*, the output voltage of the sampling gate 12 then becomes comparable to the output voltage of the pulse generator 14.

When the timing information pulse X has the logical value 0, the sampling gate 12 is turned "off," that is, the switch 12′ is opened, with the result that the electric charge stored in the capacitor 132 is then discharged, with the open-period time constant $T_{off}$ being determined by the capacitor 132 and the load resistor 18. The open-period time constant $T_{off}$ is larger than the closed-period time constant $T_{on}$ and is set to be greater than the longest expected succeeding time interval of the 0 of 1 states of the input digital signal I. Thus, due to the long discharging time, the output of the sampling gate 12 varies, as shown in FIG. 2*d*, along the slowly descending curve.

Since the open-period time constant $T_{off}$ of the discharging period can be made larger than the closed-period time constant $T_{on}$ by employing the sampling gate equivalent to the switch, the discharging period can be made long even if the charging period is short. It follows therefore that the open-period constant $T_{off}$ can be set to be larger than the longest expected period of successive 0 or 1 states of the input digital signal I, even if the input digital signal I of the *NRZ* code includes considerably long successive 0 or 1 codes, and consequently the terminal voltage of the capacitor 132 can be maintained substantially unchanged until sampling is performed by the next timing information pulse X.

By applying the output of the sampling gate as shown in FIG. 2*d* to the low pass filter 13, its low frequency component is extracted. The extracted component is substantially constant, as shown in FIG. 2*e*. Responsive to the extracted component, the pulse generator 14 is maintained in a condition of tightly phase-locked oscillation.

Figure 5:
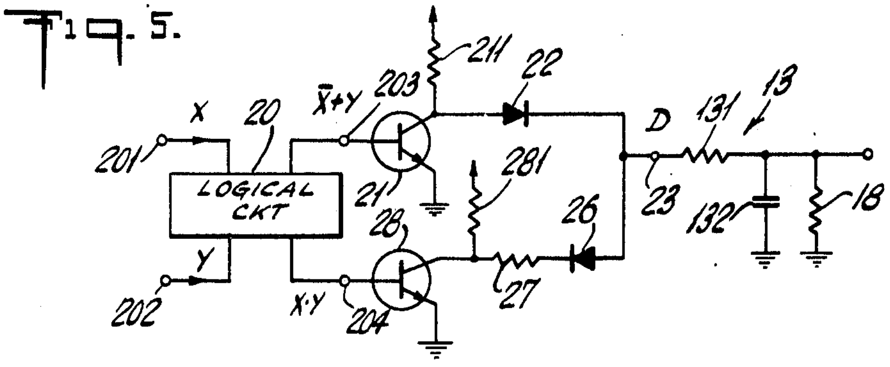
FIG. 5 is a circuit diagram, partly in block form, showing the essential portion of a further embodiment of the invention.

FIG. 5 shows a circuit for the sampling gate 12 of the embodiment of FIG. 1 which performs the phase comparison of the X and Y signals, along with the low pass filter section 13. This circuit comprises: a logical circuit 20 having two input terminals 201 and 202 respectively connected to the output of the timing information extraction circuit 11 and the voltage controlled variable frequency pulse generator 14 and sum and product-output terminals 203 and 204 for respectively deriving the logical summation $\overline{X}+Y$ and the logical product $X \cdot Y$ in response to the timing information pulse X and the output pulse Y; a first grounded emitter npn transistor 21 with its base and collector respectively connected to the logical sum-output terminal 203 and to a suitable power supply (not shown) through a resistor 211; a first diode 22 with its anode connected to the collector of the transistor 21; an output terminal 23 of the phase comparator section connected to the cathode of the first diode 22; a low pass filter 13 having a resistor 131 with one of its terminals connected to the output terminal 23 of the phase comparator section, and a capacitor 132 with one of its electrodes connected to the other of the terminals of the resistor 131 and with the other of its electrodes grounded; a load resistor 18 of the low pass filter 13; a second diode 26 with its anode connected to the output terminal 23 of the phase comparator section; a resistor 27 having a resistance equal to the resistor 211, with one of its terminals connected to the cathode of the diode 26; a second grounded emitter NPN transistor 28 with its base connected to the product-output terminal 204 and with its collector connected to the power supply (not shown) through a resistor 281 and to the other of the terminals of the resistor 27.

Upon applying to the input terminal 201 and 202 of FIG. 5 the timing information pulse X (FIG. 6*b*) obtained from the input digital signal I (FIG. 6*a*) and the output signal Y (FIG. 6*c*) of the pulse generator, respectively, the signals $\overline{X}+Y$ (FIG. $6d_1$) and $X \cdot Y$ (FIG. $6d_2$) are produced at the summation-output terminal 203 and the product-output terminal 204, respectively. Since both the transistors 21 and 28 constitute NOT circuits, The signals $\overline{\overline{X}+Y}$ and $\overline{X \cdot Y}$ (FIGS. $6d_3$ and $6d_4$) are produced at the collectors of the transistors 21 and 28, respectively. When the timing information pulse X and the pulse generator output Y have the logical values 1 and 0 respectively, both the signals $\overline{X}+Y$ and $X \cdot Y$ are the logical value 0, with the result that both the transistors 21 and 28 are nonconductive. Consequently, the current supplied from the power supply is applied through the resistor 211 and the first diode 22 to the low pass filter 13 to charge up the capacitor 132 in accordance with the time constant $T_{on}$ determined by the resistors 211 and 131, the capacitor 132 and the load resistor 18. On this occasion, the second diode 26 is not conductive because it is backward biased. The output voltage at the output terminal 23 of the phase comparator section 23 then becomes comparable to the value of the power supply voltage, as shown in FIG. *6d*.

Next, when the pulse generator output Y becomes the logical value 1. both $\overline{X}$+Y and X·Y become the logical value 1, with the result that the transistors 21 and 28 are rendered conductive, the first diode 22 is backward biased with its anode grounded, and consequently the electric charge in the capacitor 132 is discharged through the resistor 131, the diode 26, the resistor 27 and the second transistor 28, with the time constant approximately equal to the closed-period time constant. The voltage at the output terminal 23 then becomes close to the ground potential, as shown in FIG. *6d*, because the resistance of the resistor 27 is small compared with that of the resistor 131.

When the timing information pulse X becomes the logical value 0, $\overline{X}$+Y becomes the logical value 1 and X·Y becomes the logical value 0, with the result that the first and second transistors 21 and 28 become conductive and nonconductive, respectively, both the diodes 22 and 26 are backward biased, and the electric charge in the capacitor 132 proportional to the phase difference between the timing information pulse X and the pulse generator output Y is discharged, with the open-period time constant being determined by the capacitor 132 and the load resistor 18. Since this time constant is greater than the closed-period time constant, as explained earlier, the capacitor 132 is discharged slowly. FIG. *6d* shows the voltage variation at the output terminal 32 on this occasion. The output voltage of the low pass filter 13 is maintained substantially constant as shown in FIG. *6e*, even when the successive 0 or 1 state of the input digital signal persists for a long time.

Figures 6, 7:
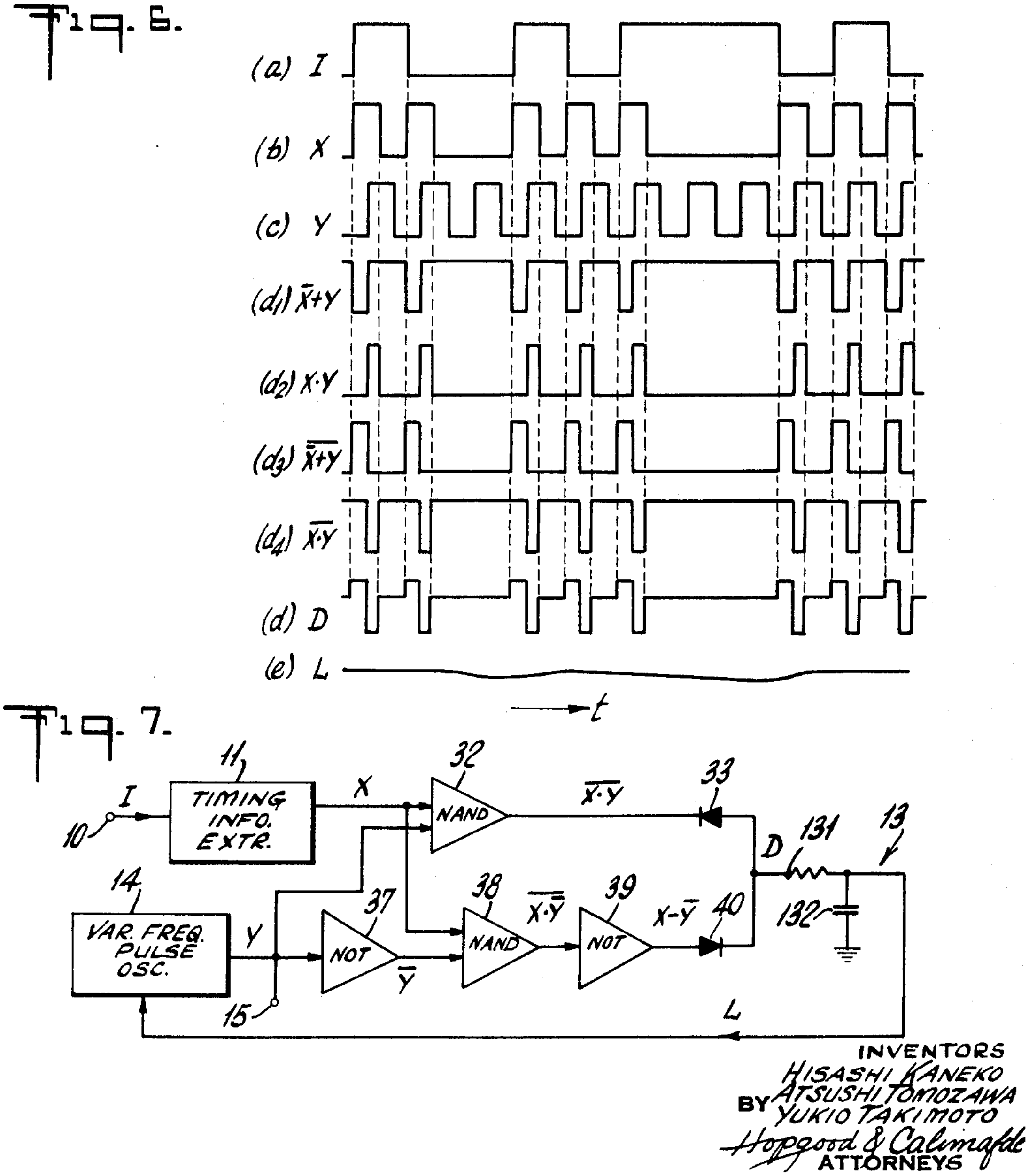
FIG. 6 is a group of waveform diagrams showing waveforms at various points of the circuit of FIG. 5.
FIG. 7 is a circuit diagram, partly in block form, showing another embodiment of the invention.

FIG. 7 illustrates another embodiment of this invention and comprises: a timing information extraction circuit 11 for generating a timing information pulse X (FIG. *6b*) in response to an input digital signal I (FIG. *6a*) received at an input terminal 10; a first NAND circuit 32 supplied with the timing information pulse X and an output pulse Y of a phase-locked oscillator 14 at its pair of input terminals for producing either a ground potential or a positive potential output, depending on whether the logical value of $\overline{X \cdot Y}$ is 0 or 1; a first diode 33 with its cathode connected to the output of the NAND circuit 32; a low pass filter 13 having a resistor 131 with one of its terminals connected to the anode of the diode 33, a capacitor 132 with one if its electrodes connected to the other of the terminals of the resistor 131 and with the other of the electrodes connected to ground; a voltage-controlled variable frequency pulse generator 14 for generating output pulses of variable frequency in response to the output voltage of the low pass filter 13 and for supplying the same to the other of the input terminals of the NAND circuit 32; an output terminal 15 for deriving the output of the pulse generator 14 as the timing pulse of the input digital signal; a first NOT circuit 37 for producing a pulse having a polarity opposite to the timing pulse applied thereto; a second NAND circuit 38 supplied with the output of the NOT circuit 37 and the timing information pulse X at its input terminals; a second NOT circuit 39 connected to the output of the NAND circuit 38 for generating a ground potential or positive potential output in response to the logical value 0 or 1, respectively; and a second diode 40 with its anode and cathode connected to the output of the NOT circuit 39 and to the anode of the diode 33, respectively.

Upon application of the input digital signal I (FIG. *6a* ) to the input terminal 10 of FIG. 7, the timing information pulse train X (FIG. *6b*) having pulses of a width equal to a half of one-bit time interval of the input digital signal I and having leading edges at the time points of the leading and trailing edges of each pulse of the input signal I, is obtained at the output of the timing information extraction circuit 11. The timing information pulse X and the output pulse Y (FIG. *6c*) are applied to the first NAND circuit 32, which in turn produces a pulse $\overline{X \cdot Y}$ (FIG. *6d₄*) at its output terminal. The output of this NAND circuit 32 is either at ground potential or positive potential depending on whether $\overline{X \cdot Y}$ is the logical value 0 or 1. The output pulse Y (FIG. *6c*) is applied to the first NOT circuit 37, which produces the output pulse $\overline{Y}$. The timing information pulse X and the output pulse $\overline{Y}$ are applied to the second NAND circuit 38, which produces the output pulse $\overline{X \cdot \overline{Y}}$. This output pulse $\overline{X \cdot \overline{Y}}$ is then applied to the second NOT circuit 39, which produces the output pulse X·$\overline{Y}$. The output of the second NOT circuit 39 is, as in the case of the output of the first NAND circuit 32, either ground potential or positive potential depending on whether the pulse X·$\overline{Y}$ is the logical value 0 or 1. It is obvious from the characteristics of Boolean algebra that the output pulse X·$\overline{Y}$ of the second NOT circuit 39 is equal to the pulse $\overline{\overline{X}+Y}$ (FIG. *6d₃*). In other words, the circuit comprising the NAND circuits 32 and 38, and the NOT circuits 37 and 39, operates in the same manner as the sampling type phase comparator section of the FIG. 5 embodiment described above.

While the foregoing description sets forth the principles of the invention in connection with specific apparatus, it is to be understood that the description is made only by way of example and not as a limitation of the scope of the invention.

I claim:

1. A phase-locked pulse generator arrangement comprising timing information extraction means for deriving a timing information pulse from an input digital signal in which the occurrence probability of waveform transitions is not constant; a pulse generator for generating a pulse train having a repetition frequency varying in response to a low frequency control signal, sampling gate means having a first input coupled to said timing information extraction means and a second input coupled to said pulse generator, said sampling means having an open and closed period in response to the state of said information pulse, said sampling means comprising means for generating a sampled signal corresponding to the phase difference between said pulse train and said timing information pulse, a low pass filter coupled to the output of said sampling gate means and having a charging circuit for extracting the low frequency component from said sampled signal and for supplying said component as said low frequency control signal to said pulse generator, means for establishing first and second discharge paths for said filter charging circuit in response to the open and closed periods of said sampling gate means such that the time constant of said low pass filter charging circuit in the open period of said sampling gate means is greater than its time-constant in the closed period of said sampling gate means and greater than the longest expected succeeding time interval of one of the states of said input digital signal; and an output terminal for deriving the output of said pulse generator as the timing pulse of said input digital signal.

2. The invention described in claim 1 wherein said timing information extraction means comprises:

- a pulse transformer having its primary connected to receive said input digital signal;
- a differential circuit connected to the secondary of said transformer;
- a rectifier circuit connected to receive the output from said differential circuit;
- a multivibrator connected to receive the output from said rectifier circuit; and
- said timing information pulse being present at the output of said multivibrator.

3. The invention described in claim 1 wherein said sampling gate means comprises:

- a logical circuit for receiving said timing information pulse at one input terminal thereof and said pulse train at another input terminal thereof;

means in said logical circuit for providing from the input signal pulses thereto a summation output signal and a product output signal at first and second output terminals thereof, respectively;

said sampling gate means having a common output terminal connected to the input of said low pass filter;

a first NOT circuit transistor and a first diode connected in series between said first output terminal and said common output terminal;

a first resistor connected between the collector of said first transistor and the source of potential therefor; and a second NOT circuit transistor, a second resistor and a second diode connected in series between said second output terminal and said common output terminal.

4. The invention described in claim 3 wherein said low pass filter includes a third resistor and a capacitor connected in series between said common output terminal and ground, and a fourth resistor bridging said capacitor.

5. The invention described in claim 4 which further includes a first time constant charging circuit and a second time constant discharging circuit.

6. The invention described in claim 5 wherein:

said first time constant charging circuit comprises a series circuit including said first resistor, said first diode, said third resistor and said capacitor; and said second time constant discharging circuit comprises a series circuit including said third resistor, said second diode, said second resistor, said second transistor and said capacitor.

7. A phase-locked pulse generator arrangement comprising:

means for deriving a timing information pulse from an input digital signal;

a first NAND circuit having a first input terminal for receiving said timing information pulse, said circuit also having a second input terminal;

a first diode connected between the output of said first NAND circuit and a common terminal;

a low pass filter having its input connected to said common terminal;

a variable frequency pulse oscillator for generating a pulse train at the output thereof;

means for coupling the output of said low pass filter to the input of said oscillator;

means for coupling the pulse train at the output of said oscillator to the second input terminal of said first NAND circuit;

a first NOT circuit for also receiving said pulse train from the output of said oscillator;

a second NAND circuit also having first and second input terminals;

means for coupling said timing information pulse to the first input terminal of said second NAND circuit;

means for coupling the output from said first NOT circuit to the second input terminal of said second NAND circuit;

a second NOT circuit coupled to receive the output from said second NAND circuit; and and a second diode connected between the output of said second NOT circuit and said common terminal, whereby the frequency of said oscillator is closely controlled.